F. N. SPRAGUE.
AUXILIARY SPRING.
APPLICATION FILED MAY 14, 1913.
1,134,927.
Patented Apr. 6, 1915.
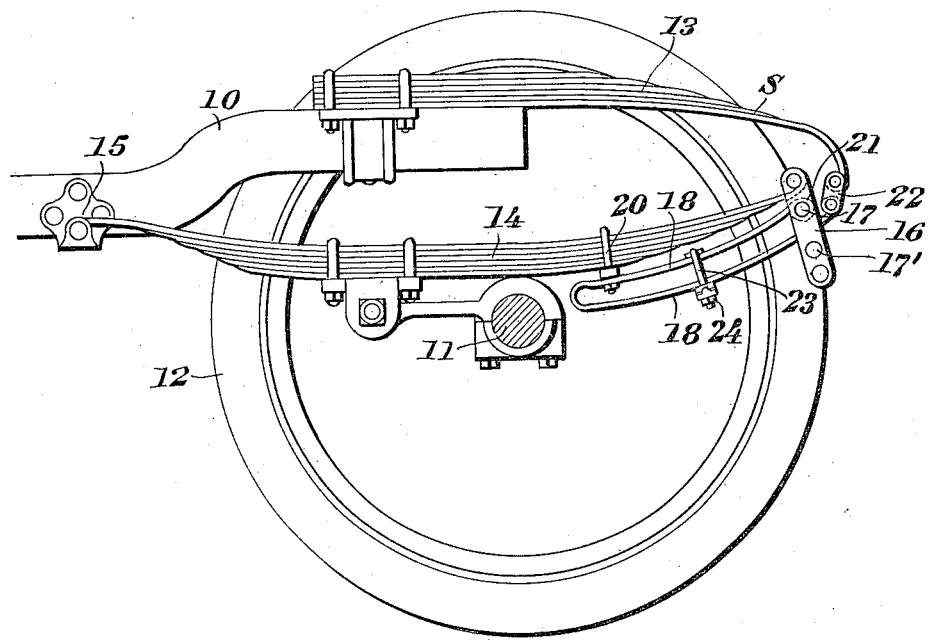
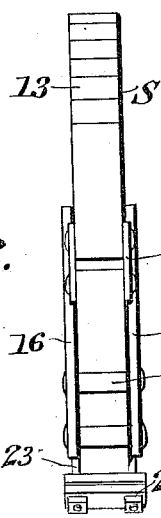
Witnesses
Inventor
F. N. Sprague
By Victor J. Evans
Attorney

UNITED STATES PATENT OFFICE.

FRANK N. SPRAGUE, OF SEDGWICK, COLORADO.

AUXILIARY SPRING.

1,134,927.  Specification of Letters Patent.  Patented Apr. 6, 1915.

Application filed May 14, 1913. Serial No. 767,662.

*To all whom it may concern:*

Be it known that I, FRANK N. SPRAGUE, a natural-born citizen of the United States, residing at Sedgwick, in the county of Sedgwick and State of Colorado, have invented new and useful Improvements in Auxiliary Springs, of which the following is a specification.

This invention relates to improvements in auxiliary springs for use in conjunction with the main springs of vehicles.

In carrying out the present invention, it is my purpose to provide an auxiliary spring which will be found especially useful in conjunction with two part vehicle springs and which will be interposed between the parts of such vehicle springs so as to receive and support the weight of the vehicle under normal conditions.

It is also my purpose to provide an auxiliary spring designed for use in conjunction with two part vehicle springs and which will embody, in its construction, superposed members one of which has one end thereof connected to one part of the vehicle spring, while the other has the adjacent end connected to the remaining part of the vehicle spring through the medium of a lost motion device so that the main spring will supplement the action of the auxiliary spring when the latter has yielded to its greatest capacity.

Furthermore, I aim to provide an auxiliary spring of the class described which will embrace the desired features of simplicity, efficiency, durability and strength and which may be readily applied to the main springs of the vehicle.

With the above and other objects in view, the invention consists in the construction, combination and arrangement of parts hereinafter set forth in and falling within the scope of the claim.

In the accompanying drawings: Figure 1 is a fragmentary side elevation of a vehicle showing the main spring thereof equipped with an auxiliary spring constructed in accordance with the present invention. Fig. 2 is an end view of the main spring and auxiliary spring assembled.

Referring now to the accompanying drawing in detail, the numeral 10 designates the body or chassis of an automobile or other form of vehicle, such body being mounted upon the axles 11 carrying the wheels 12 as usual. The main spring of the vehicle is indicated at S and, in the present instance, is in the form of a three quarter elliptic spring having the upper member 13 fastened at one end to the body of the vehicle through the medium of clips or the like as is well known, while the bottom member 14 rests upon the axles 11 and is suitably fastened thereto.

One end of the member 14 of the spring S is fastened to the body of the vehicle as at 15, while connected to and depending from the opposite end thereof are straps 16, 16 spaced apart in parallelism and carrying, immediately below the respective end of the member 14, a cross bar 17, a roller 17′ being carried by the lower extremities of the straps.

My improved auxiliary spring is disposed below the lower member 14 of the main spring S upon one side of the vehicle axle 11 and comprises superposed members 18 connected to each other at their inner ends. One end of this auxiliary spring is fixed and, in the present instance, the upper member of such spring, adjacent to the inner end thereof, is fastened to the lower member of the main spring through the medium of a yoke or clevis 20. The free extremity of the top member of the auxiliary spring is formed to provide an eye 21 and surrounds the cross bar 17, while the similar extremity of the lower member of the auxiliary spring is connected through the medium of a link 22 with the free end of the top member 13 of the main spring. In the present instance, I employ a tension adjuster to regulate the relative movement of the members of the auxiliary spring, such adjuster comprising a headed bolt 23 passed through alining apertures in the superposed members 18, 18 of the auxiliary spring between the ends of such members and equipped with a nut 24 threadedly engaging the free end thereof.

From the foregoing description taken in connection with the accompanying drawing, the construction, mode of operation and manner of employing my invention will be readily apparent. Owing to the link 22 connecting the respective ends of the top member of the main spring and the lower member of the auxiliary spring, it will be seen that the latter normally maintains the weight of the body of the vehicle, while when the wheel of the vehicle strikes an obstruction or hump in the roadway, the lower member 14 of the main spring of the vehicle will move in an upward direction thereby placing the lower member of the auxiliary spring under tension. As the upward movement of the lower member of the main spring increases, this strain or tension will be transmitted from the lower member of the auxiliary spring to the upper member thereof through the medium of the tension adjuster and from the top member of the auxiliary spring the weight of the vehicle body will be transferred to the lower member of the main spring of the vehicle. As the lower member of the auxiliary spring reaches the limit of its downward movement, such member contacts with the roller 17' so that unnecessary strain on the auxiliary spring is eliminated. By means of the tension adjuster, it will be seen that the movement of the lower member of the auxiliary spring relatively to the upper member may be varied. It will be observed that the main spring will supplement the auxiliary spring when the latter has yielded to its full capacity, while the auxiliary spring under normal conditions, supports the body of the vehicle.

I claim:

The combination with a two part vehicle spring, of an auxiliary spring fixed at one end and composed of superposed members, a connection between one end of said members and one part of said vehicle spring, whereby the main spring will supplement the auxiliary spring when the latter has yielded to its full capacity, and a tension adjuster connecting the members of said auxiliary spring whereby the relative movement thereof may be varied.

In testimony whereof I affix my signature in presence of two witnesses.

FRANK N. SPRAGUE.

Witnesses:
GLEN B. MCKINSTRY,
C. B. KIMBALL.

Copies of this patent may be obtained for five cents each, by addressing the "Commissioner of Patents, Washington, D. C."